(12) United States Patent
Mallis et al.

(10) Patent No.: US 6,530,607 B1
(45) Date of Patent: Mar. 11, 2003

(54) TWO-STEP THREADED CONNECTOR HAVING DIFFERENTIAL THREAD WIDTH

(75) Inventors: David L. Mallis, The Woodlands, TX (US); Robert S. Sivley, IV, Kingwood, TX (US)

(73) Assignee: Hydril Company, Houston, TX (US)

( * ) Notice: Subject to any disclaimer, the term of this patent is extended or adjusted under 35 U.S.C. 154(b) by 47 days.

(21) Appl. No.: 09/707,278

(22) Filed: Nov. 6, 2000

(51) Int. Cl.$^7$ ................................................ F16L 15/00
(52) U.S. Cl. ........................ 285/333; 285/334; 285/390
(58) Field of Search ................................. 285/334, 333, 285/390, 355

(56) References Cited

U.S. PATENT DOCUMENTS

| | | | | |
|---|---|---|---|---|
| 4,161,332 A | * | 7/1979 | Blose | 285/334 |
| 4,244,607 A | * | 1/1981 | Blose | 285/92 |
| 4,373,754 A | * | 2/1983 | Bollfrass et al. | 285/334 |
| 4,582,348 A | | 4/1986 | Dearden et al. | 285/175 |
| 4,600,224 A | * | 7/1986 | Blose | 285/334 |
| 4,662,659 A | | 5/1987 | Blose et al. | 285/334 |
| 4,688,832 A | | 8/1987 | Ortloff et al. | 285/175 |
| 4,753,460 A | * | 6/1988 | Tung | 285/334 |
| 5,829,797 A | | 11/1998 | Yamamoto et al. | 285/333 |

* cited by examiner

*Primary Examiner*—Lynne H. Browne
*Assistant Examiner*—Giovanna Collins
(74) *Attorney, Agent, or Firm*—Rosenthal & Osha L.L.P.

(57) ABSTRACT

A threaded connector includes a pin member having a large thread step and a small thread step. The pin member has a first sealing surface between the steps. Threads on the steps of the pin member each have load flanks and stab flanks. The connector includes a box member having a large thread step and a small thread step corresponding to the thread steps on the pin member. The box member has a second sealing surface corresponding to the first sealing surface. Threads on the steps of the box member have load flanks and stab flanks corresponding to the threads on the pin member. The threads on the large thread step have a first clearance between corresponding stab flanks on the pin and box members when the pin and box members are assembled and the corresponding load flanks are engaged. The threads on the small step have a second clearance between corresponding stab flanks when the pin and box members are assembled. The first clearance in one embodiment is smaller than the second clearance.

16 Claims, 2 Drawing Sheets

TWO-STEP THREADED CONNECTOR HAVING DIFFERENTIAL THREAD WIDTH

FIELD OF THE INVENTION

The invention is related to the field of threaded couplings such as used to join segments of drill pipe and the like. More specifically, the invention is related to types of threaded connectors that can withstand very high differential fluid pressures, both internal to and external to coupled pipe segments.

BACKGROUND OF THE INVENTION

Two-step threaded connections are known in the art for providing high capacity to resist internal and external differential pressures in a pipe assembled from threadedly coupled segments. The threaded connections form metal-to-metal seals which are capable of holding the differential pressures under a wide range of axial stresses and bending stresses on the assembled pipe. Examples of two-step threaded connections are shown in U.S. Pat. No. 4,662,659 issued to Blose et al, and in U.S. Pat. No. 4,688,832 issued to Ortloff et al.

The two-step threaded connectors in both the '832 and '659 patents include a positive stop torque shoulder which limits the axial movement between female and male portions of the threaded coupling as the coupling is assembled and tightened to the proper torque. In some cases, the assembled pipe segments are subjected to very high axial compressive loading. It is desirable to have a threaded connection which can withstand even higher axial compressive loading than the connections known in the art so that the reliability of the connector can be increased.

SUMMARY OF THE INVENTION

One aspect of the invention is a threaded connector which includes a pin member having a large thread step and a small thread step. The pin member has a first sealing surface between the steps. Threads on the steps of the pin member each have load flanks and stab flanks. The connector includes a box member having a large thread step and a small thread step corresponding to the thread steps on the pin member. The box member has a second sealing surface corresponding to the first sealing surface. Threads on the steps of the box member have load flanks and stab flanks corresponding to the threads on the pin member. The threads on the large thread step have a first clearance between corresponding stab flanks on the pin and box members when the pin and box members are assembled and the corresponding load flanks are engaged. The threads on the small step have a second clearance between corresponding stab flanks when the pin and box members are assembled. In one embodiment, the first clearance is smaller than the second clearance so that axial movement between the pin and box is limited. This can increase the axial compression capability of the connector.

Other aspects and advantages of the invention will be apparent from the following description and the appended claims.

DETAILED DESCRIPTION

Figure 1:
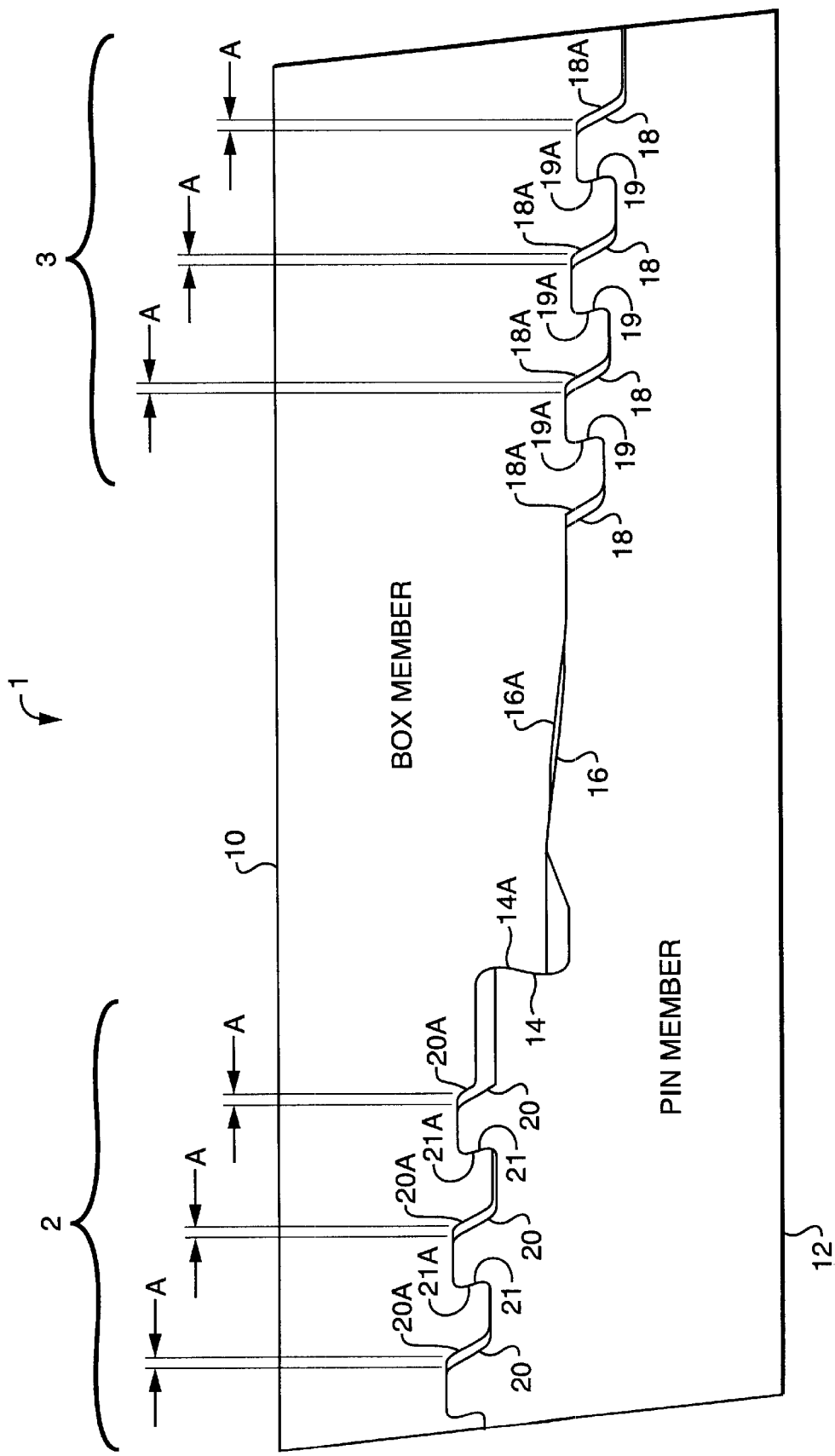
FIG. 1 shows a cross-section through one side of a two-step threaded coupling made according to the prior art.

FIG. 1 shows a typical prior art two-step threaded coupling for purposes of distinguishing the invention. A two-step threaded coupling 1 consists of a male portion or "pin member" 12 which is inserted into a female portion or "box member" 10 to make up the coupling 1. As is known in the art, the pin member 12 and box member 10 are typically formed into the ends of a segment of pipe (not shown) to enable coupling of like segments of the pipe (not shown). The two-step connector 1 includes a small diameter step ("small step") 3 closest to the end of the pin member 12, which includes threads having stab flanks 18 and load flanks 19. Corresponding threads in the box member 10 are shown at 18A and 19A. Preferably, the threads are formed so that there is a clearance A between the stab flanks 18, 19 all the way from the root to the crest of each of the threads. Corresponding threads are formed on a large diameter step 2 ("large step"), where stab flanks are shown at 20 and 20A for the pin 12 and box 10 ends, respectively, and load flanks are shown, respectively at 21 and 21A. In between the small step 3 and the large step 2 on each of the pin 12 and box 10 are corresponding metal to metal sealing surfaces 16, 16A. When the box member 10 and pin member 12 are engaged, the corresponding sealing surfaces 16A, 16 are put into compressive contact to form a metal to metal seal. Relative axial movement between the pin member 12 and box member 10 during make up of the connection 1 is limited by a positive stop torque shoulder formed from surfaces 14 and 14A, respectively. Structures for the positive stop torque shoulder are described, for example in U.S. Pat. No. 4,662,659 issued to Blose et al. In the prior art, a clearance A between the stab flanks, upon application of make-up torque, is substantially the same for both the large step 2 (shown between thread flanks 20 and 20A) and for the small step 3 (shown between thread flanks 18 and 18A).

Figure 2:
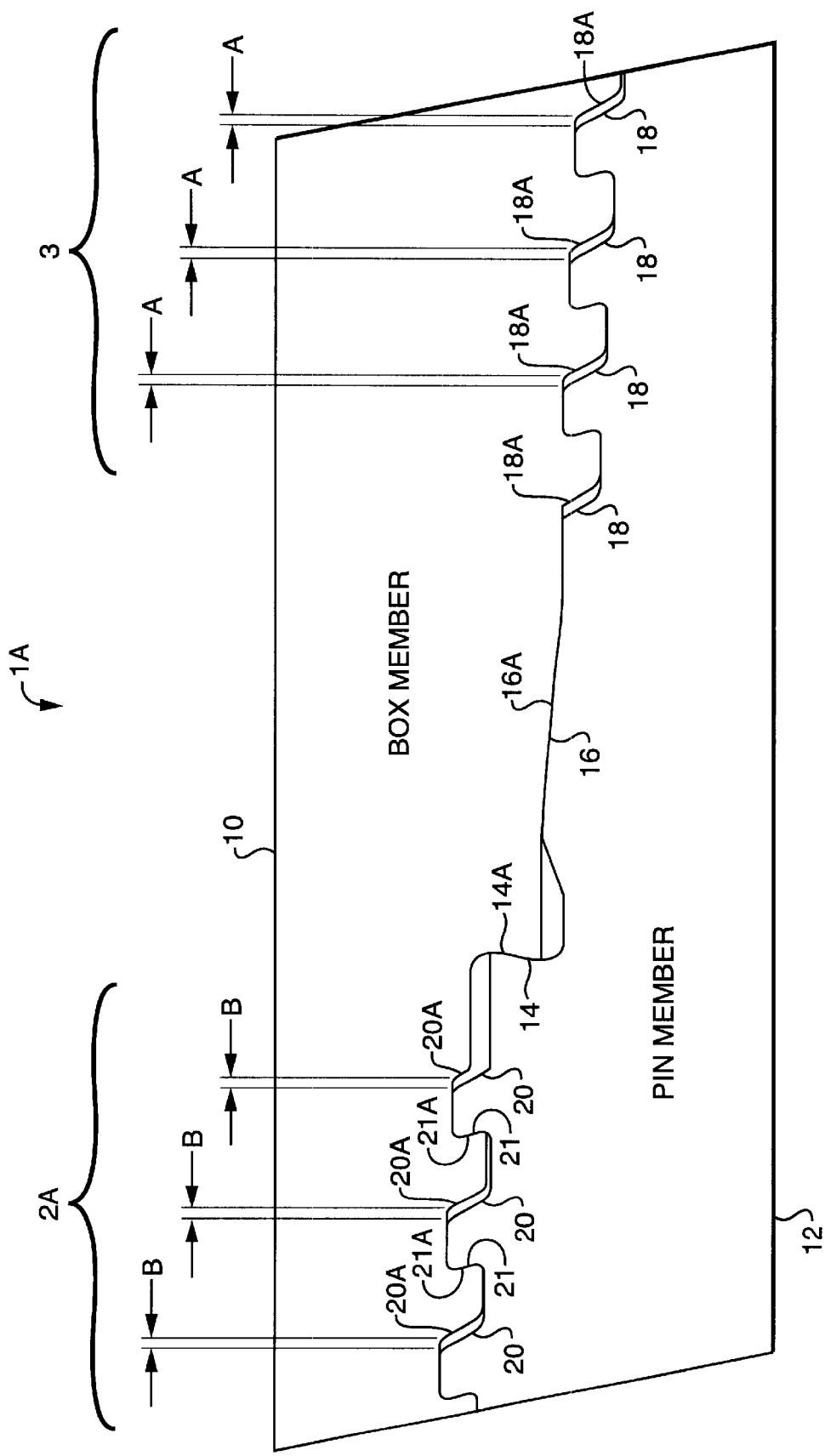
FIG. 2 shows a cross section through one side of one example of a two step threaded coupling made according to the invention.

FIG. 2 shows one example of a two-step threaded connector 1A made according to the invention. A clearance between the stab flanks 20, 20A on the pin 12 and box 10 members in the large step 2A is shown by B. In a two-step connector made according to one embodiment of the invention, the clearance B on the large step 2A is smaller than the clearance A on the small step 3. One way to provide such additional clearance is to machine both the large step 2A and the small step 3, on both the pin 12 and box 10 members, using a threading insert (not shown) having the same thread form for both steps 2A, 3. Then, the axial position of each of the threading inserts (not shown) is shifted, and the threads on the small step 3, on both the pin 12 and box 10 members, are re-cut to provide a greater stab flank clearance between stab flanks 18 and 18A on the small step. Alternatively, two different threading inserts (not shown) each having a different thread width could be used to form threads according to the invention.

The pin member 12 and box member 10 shown in FIG. 2 are arranged so that there is a metal to metal seal (not shown) formed by contact between an inner surface (not shown) on the box member 10 and the nose (not shown) of the pin member 12. Such seal arrangements are known in the art. One such seal arrangement is shown in U.S. Pat. No. 4,688,832 issued to Ortloff et al. In one example of a two-step connector according to the invention, the clearance A between the stab flanks 18, 18A on the small step 3 is in a range of about 0.007 to 0.015 inches (0.18 to 0.85 mm) and the clearance B between the stab flanks on the large step 2A is in a range about 0.002 to 0.006 inches (0.05 to 0.15 mm). The ranges for the stab flank thread clearances are selected to substantially prevent lubricant ("pipe dope") entrapment in the threads of the small step 3, while using the threads of the large step 2A to limit the axial movement between the pin member 12 and box member 10 under axial compression of the threaded coupling 1A. As is known in the art, lubricant entrapment can take place in threads disposed between two metal to metal seals. The larger stab flank clearance on the small step in this embodiment is intended to reduce the possibility of lubricant entrapment between the metal to metal seals. As will be appreciated by those skilled in the art, the location of the metal to metal seals may be different in other embodiments of a two-step threaded connector. For example, a first metal to metal seal could be formed at the base of the pin member and the corresponding end of the box member. The second metal to metal seal could be positioned substantially as shown in FIG. 2 near the positive stop torque shoulder. In such arrangements of metal to metal seals, the smaller clearance between the stab flanks would be on the threads of the small step 3, shown at A, and the larger clearance would be at B on the large step 2A. What is important in any embodiment of the invention is that the larger stab flank clearance be on the thread step positioned between metal to metal seals. The smaller stab flank clearance in any embodiment should be located on the thread step which is unsealed at one end.

Preferably, the threads on both the large step 2A and the small step 3 have the same form throughout each step 2A, 3 but are different between the steps 2A, 3. The threads on each step 2A, 3 also preferably have the same pitch on each step 2A, 3. The threads on each step 2A, 3 also preferably are tapered, and have clearance from the root to the crest and between the stab flanks 20, 20A and 18, 18A respectively, of each thread when the load flanks 21, 21A and 19, 19A respectively, are engaged. Further, the threads on each step 2A, 3 may be tapered and have interference between the roots and crests. "Tapered" means that the thread diameter decreases toward the end of the pin member 10, as explained, for example, in the Blose et al '652 patent. The threads on each step 2A, 3 may also have a substantially constant diameter ("cylindrical" threads).

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

What is claimed is:

1. A threaded connector, comprising:
a pin member having a large thread step and a small thread step thereon, the pin member having a first sealing surface between the steps, threads on the large and small thread steps each having load flanks and stab flanks thereon; and
a box member having a large thread step and a small thread step thereon corresponding to the thread steps on the pin member, the box member having a second sealing surface corresponding to the first sealing surface, threads on the steps of the box member having load flanks and stab flanks corresponding to the threads on the steps of the pin member, and wherein
the threads on the large step have a first clearance between corresponding stab flanks on the pin and box members when the pin and box members are assembled and corresponding load flanks are engaged, and the threads on the small step have a second clearance between corresponding stab flanks when the pin and box members are assembled and corresponding load flanks are engaged, the first clearance smaller than the second clearance.

2. The threaded connector as defined in claim 1 further comprising a positive stop torque shoulder proximate to the first and second sealing surfaces.

3. The threaded connector as defined in claim 1 wherein the large thread step and the small thread step comprise tapered threads.

4. The threaded connector as defined in claim 1 wherein the large thread step and the small thread step comprise cylindrical threads.

5. The threaded connector as defined in claim 1 wherein the second clearance is selected to substantially prevent lubricant entrapment in the small step.

6. The threaded connector as defined in claim 1 wherein the first clearance is selected to substantially limit axial displacement during compressional loading of the connector.

7. The threaded connector as defined in claim 1 wherein the first clearance is in a range of about 0.002 to 0.006 inches.

8. The threaded connector as defined in claim 1 wherein the second clearance is in a range of about 0.007 to 0.015 inches.

9. A threaded connector, comprising:
a pin member having a large thread step and a small thread step thereon, the pin member having a first sealing surface between the steps, threads on the large and small thread steps each having load flanks and stab flanks thereon; and
a box member having a large thread step and a small thread step thereon corresponding to the thread steps on the pin member, the box member having a second sealing surface corresponding to the first sealing surface, threads on the steps of the box member having load flanks and stab flanks corresponding to the threads on the steps of the pin member, and wherein
the threads on the large step have a first clearance between corresponding stab flanks on the pin and box members when the pin and box members are assembled and corresponding load flanks are engaged, and the threads on the small step have a second clearance between corresponding stab flanks when the pin and box members are assembled and corresponding load flanks are engaged, the first clearance larger than the second clearance.

10. The threaded connector as defined in claim 9 further comprising a positive stop torque shoulder proximate to the first and second sealing surfaces.

11. The threaded connector as defined in claim 9 wherein the large thread step and the small thread step comprise tapered threads.

12. The threaded connector as defined in claim 9 wherein the large thread step and the small thread step comprise cylindrical threads.

13. The threaded connector as defined in claim 9 wherein the first clearance is selected to substantially prevent lubricant entrapment in the large step.

14. The threaded connector as defined in claim 9 wherein the second clearance is selected to substantially limit axial displacement during compressional loading of the connector.

15. The threaded connector as defined in claim 9 wherein the second clearance is in a range of about 0.002 to 0.006 inches.

16. The threaded connector as defined in claim 9 wherein the first clearance is in a range of about 0.007 to 0.015 inches.

* * * * *